(No Model.)

C. H. DRIVER.
JACK CARRIER.

No. 345,490. Patented July 13, 1886.

WITNESSES:
W. W. Hollingsworth
Edw. W. Byrn

INVENTOR:
C. H. Driver
BY Munn & Co
ATTORNEYS.

UNITED STATES PATENT OFFICE.

CHARLES HENRY DRIVER, OF TOWNS, GEORGIA, ASSIGNOR OF ONE-HALF TO MADISON M. BUSH, OF SAME PLACE.

JACK-CARRIER.

SPECIFICATION forming part of Letters Patent No. 345,490, dated July 13, 1886.

Application filed February 27, 1886. Serial No. 193,531. (No model.)

*To all whom it may concern:*

Be it known that I, CHARLES HENRY DRIVER, of Towns, in the county of Telfair and State of Georgia, have invented a new and useful Improvement in Jack-Carriers, of which the following is a specification.

Figure 1:
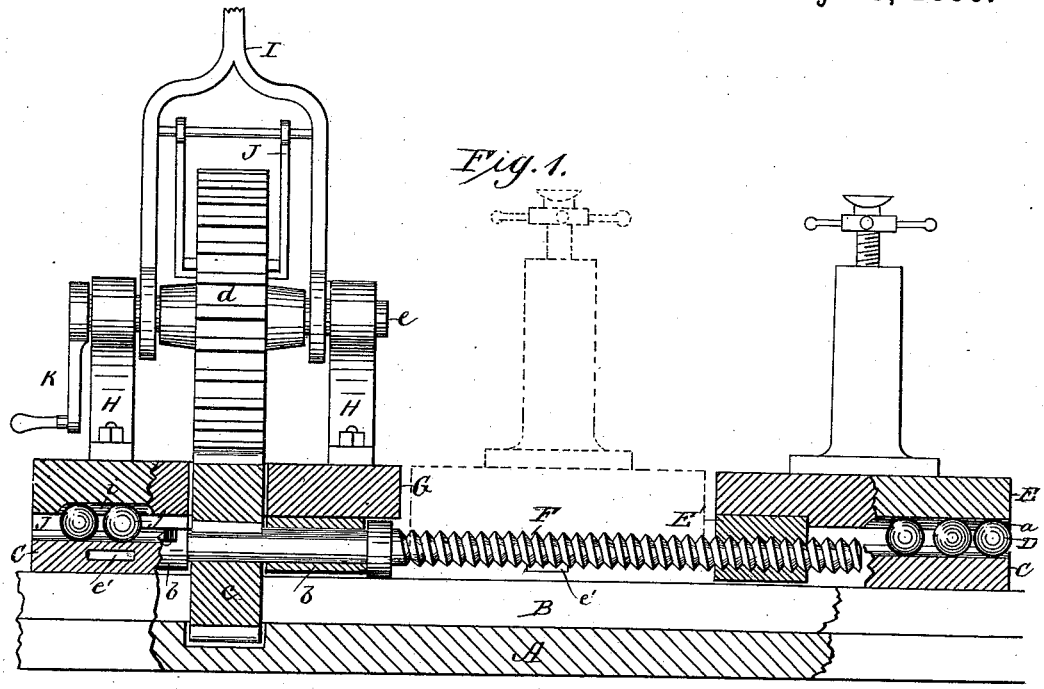
Figure 2:
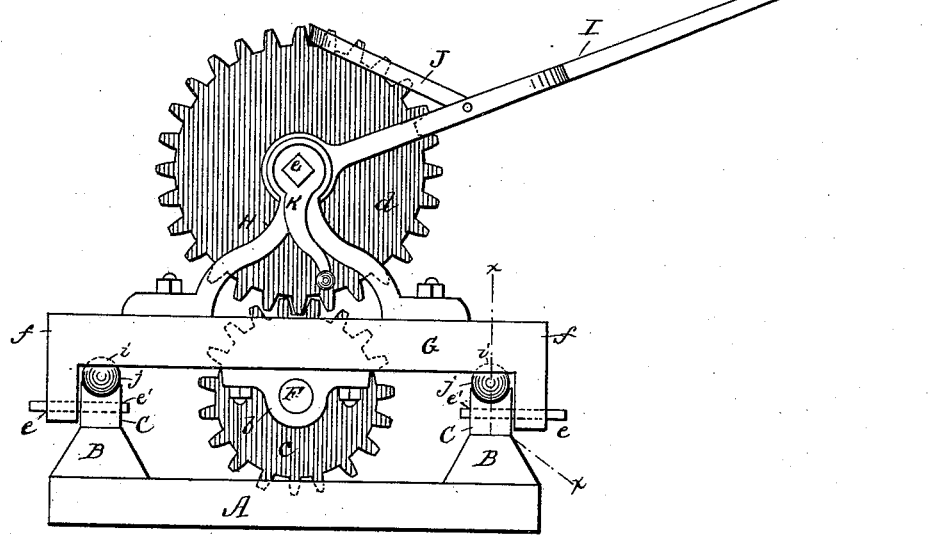

Figure 1 is a side elevation with the end portions in section in the plane of line $xx$, Fig. 2, and with the intermediate parts in section through the middle or plane of the screw-shaft. Fig. 2 is an end elevation.

The object of my invention is to provide a means for transporting lifting-jacks horizontally after they have been applied to and made to raise a building, a loaded car, or other heavy object to be moved; and it consists in a convenient and effective means for accomplishing this with greater certainty and safety and at much less cost than usual, which I will now proceed to describe.

In the drawings, A represents the base timber or sill, upon which are mounted two parallel stringers, B B, upon which are mounted the steel rails C C, which, with the stringers, are strongly fastened to the sill. These rails C C have each a round groove in the upper edge to receive steel balls D, upon which is sustained the horizontally-sliding platform E, upon which the lifting-jack is to be placed, and which platform has upon its under sides grooves $a\ a$, just above and parallel with the tracks, which grooves $a$ rest upon the series of balls on the grooves of the steel tracks. To the bottom side of this platform is securely fastened a heavy screw-bearing, E', which is screw-threaded interiorly to receive the stout screw-shaft F, by the revolution of which the platform and the lifting-jack are moved sidewise. This screw-shaft is journaled in bearings $b\ b$, attached to the under side of the platform G, and between these bearings has a rigidly-attached pinion or gear wheel, $c$, that projects upwardly through an opening in the platform and engages with a larger gear-wheel, $d$, that is rigidly attached to its shaft $e$. This shaft is journaled in the elevated bracket-frames H H, which latter are bolted at the bottom to this platform.

On opposite sides of the large wheel $d$ are disposed the two branches of the oscillating lever I, which branches have at their lower ends eyes that embrace the shaft of the large wheel, and which branches of the lever have also a loop or pull-link, J, hinged to the same, which, by dropping into the notches between the teeth of the large wheel, secures a hold when the lever is moved in one direction that causes the wheel to turn within the lever and rotate the pinion and screw-shaft below, and which loop or link slides over the teeth of the wheel when the lever is moved in the opposite direction. The platform G has downwardly-extending wings or flanges $f$ on its ends that occupy a position outside of the rails, and said flanges have through them key-holes $e$, which correspond in shape to key-holes $e'$ in the steel rails and are in the same horizontal plane, so that a key may be driven through both of these key-holes when brought into coincidence, to hold the operating mechanism stationary upon the rails while exerting the lateral strain upon the jack-platform. The gear-platform has upon its under side, just above the rails, the round grooves $i$, which rest upon the tops of the balls $j$ and allow the platform to be easily moved to a new position. For running back the screw-shaft quickly the shaft of the large gear-wheel is provided with a crank, K, by which said wheel may be rapidly turned in opposite direction to that which it derives from the oscillating lever.

The operation of the device is as follows: The jack is placed upon the platform E and is raised, so as to lift the object which it is desired to move. The gear-platform is then adjusted close to the platform E, and in this position said gear-platform is fixed by driving a key through the key-holes $e$ and $e'$, which rigidly locks this platform to the rails. The lever now being worked back and forth the screw-rod is slowly turned, and the platform carrying the jack is slowly pushed forward on the rails as far as the length of the screw will permit. The locking-key is then removed, and the gear-platform is then run up to close proximity to the jack again by turning the crank so as to revolve the screw-rod in the opposite directions. The gear-platform being then fixed by its key to the rails again, the operation of pushing the jack along is repeated.

The sill and track-rails are designed to be made in sections, and as soon as the jack-platform is pushed to the end of one section another section is adjusted in line in front of the one the platform is resting upon.

Having thus described my invention, what I claim as new is—

1. The combination, with a set of track-rails, of a laterally-movable jack-platform bearing a screw-nut, and a laterally-adjustable gear-platform bearing operating-gears, and a horizontal screw-rod passing through the screw-nut of the jack-platform, and means for locking the gear-platform in position, substantially as described.

2. The combination of the jack-platform E, having screw-nut, the track-rails having key-holes $e'$, the gear-platform having key-holes $e$, the horizontal screw-shaft, and the gears operating the same, substantially as shown and described.

CHARLES HENRY DRIVER.

Witnesses:
 JNO. F. McRAE, Jr.,
 JNO. F. McRAE.